United States Patent
Hong et al.

(10) Patent No.: US 12,500,292 B2
(45) Date of Patent: *Dec. 16, 2025

(54) BATTERY PACK AND VEHICLE COMPRISING THE SAME

(71) Applicant: LG Energy Solution, Ltd., Seoul (KR)

(72) Inventors: Soon-Chang Hong, Daejeon (KR); Bo-Ra Jeon, Daejeon (KR); Dong-Hyun Kim, Daejeon (KR); Hyoung-Suk Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 521 days.

This patent is subject to a terminal disclaimer.

(21) Appl. No.: 18/006,815

(22) PCT Filed: Oct. 6, 2021

(86) PCT No.: PCT/KR2021/013727
§ 371 (c)(1),
(2) Date: Jan. 25, 2023

(87) PCT Pub. No.: WO2022/080744
PCT Pub. Date: Apr. 21, 2022

(65) Prior Publication Data
US 2023/0275286 A1    Aug. 31, 2023

(30) Foreign Application Priority Data
Oct. 16, 2020   (KR) .................. 10-2020-0134586

(51) Int. Cl.
*H01M 10/6567* (2014.01)
*B60L 50/64* (2019.01)
(Continued)

(52) U.S. Cl.
CPC ......... *H01M 10/6567* (2015.04); *B60L 50/64* (2019.02); *H01M 10/613* (2015.04);
(Continued)

(58) Field of Classification Search
CPC ........... H01M 10/6567; H01M 10/613; H01M 10/625; H01M 50/211; H01M 50/249;
(Continued)

(56) References Cited

U.S. PATENT DOCUMENTS

2012/0055725 A1    3/2012  Mizoguchi et al.
2015/0132673 A1*   5/2015  Hood ................ H01M 8/04014
                                                        429/535
(Continued)

FOREIGN PATENT DOCUMENTS

CN      101533933 A        9/2009
CN      106797005 A   *    5/2017    ............. B60R 16/04
(Continued)

OTHER PUBLICATIONS

International Search Report for PCT/KR2021/013727 mailed Jan. 24, 2022. 3 pgs.

*Primary Examiner* — Kaity V Chandler
(74) *Attorney, Agent, or Firm* — Lerner David LLP

(57) ABSTRACT

A battery pack according to the present disclosure includes a first battery module; a first top cover provided on the first battery module; a second battery module mounted on top of the first battery module on the first top cover; a second top cover provided on the second battery module; an inter-top cover part acting as a cooling device interposed between the first top cover and the second top cover, includes a heatsink having a cooling water passage space, an inter-top cover part upper member in contact with an upper surface of the heatsink, and a heatsink port for entry/exit of cooling water to/from the cooling water passage space; a lower gasket provided at a contact area between the first top cover and the inter-top cover part; and an upper gasket provided at a contact area between the second top cover and the inter-top cover part.

9 Claims, 5 Drawing Sheets

(51) Int. Cl.
  *H01M 10/613* (2014.01)
  *H01M 10/625* (2014.01)
  *H01M 50/211* (2021.01)
  *H01M 50/249* (2021.01)
  *H01M 50/271* (2021.01)
  *H01M 50/289* (2021.01)

(52) U.S. Cl.
  CPC ....... *H01M 10/625* (2015.04); *H01M 50/211* (2021.01); *H01M 50/249* (2021.01); *H01M 50/271* (2021.01); *H01M 50/289* (2021.01)

(58) Field of Classification Search
  CPC ............. H01M 50/271; H01M 50/289; H01M 50/258; H01M 2220/20; H01M 10/653; H01M 10/6551; H01M 10/6556; H01M 50/20; B60L 50/64; Y02E 60/10
  See application file for complete search history.

(56) References Cited

U.S. PATENT DOCUMENTS

| | | | |
|---|---|---|---|
| 2016/0355100 A1* | 12/2016 | Ito | H01M 10/6568 |
| 2019/0051956 A1 | 2/2019 | Jeon et al. | |
| 2019/0058227 A1* | 2/2019 | Thomas | H01M 50/147 |
| 2019/0089026 A1 | 3/2019 | Choi et al. | |
| 2019/0267682 A1 | 8/2019 | Seo et al. | |
| 2019/0296407 A1* | 9/2019 | Newman | H01M 10/6555 |
| 2020/0076026 A1 | 3/2020 | Ohkuma | |
| 2020/0161721 A1* | 5/2020 | Wang | H01M 10/6567 |
| 2020/0161728 A1* | 5/2020 | Wang | H01M 10/6554 |
| 2020/0176740 A1 | 6/2020 | Cassard et al. | |
| 2020/0266505 A1 | 8/2020 | Park et al. | |
| 2021/0143378 A1* | 5/2021 | Probert | B60L 50/66 |
| 2021/0226274 A1* | 7/2021 | Negrete | H01M 50/20 |

FOREIGN PATENT DOCUMENTS

| | | | | |
|---|---|---|---|---|
| CN | 207368169 U | | 5/2018 | |
| CN | 109390502 A | | 2/2019 | |
| CN | 110323516 A | | 10/2019 | |
| CN | 111509327 A | * | 8/2020 | .......... H01M 10/613 |
| CN | 211320164 U | * | 8/2020 | ............ Y02E 60/10 |
| CN | 213278181 U | * | 5/2021 | ............ Y02E 60/10 |
| CN | 113113718 A | * | 7/2021 | ........ H01M 10/0625 |
| CN | 213989096 U | * | 8/2021 | ............ Y02E 60/10 |
| JP | 2015216071 A | | 12/2015 | |
| JP | 6220826 B2 | | 10/2017 | |
| JP | 6337603 B2 | * | 6/2018 | ............ Y02E 60/10 |
| JP | 6683779 B2 | | 4/2020 | |
| KR | 20120015446 A | | 2/2012 | |
| KR | 20170071756 A | | 6/2017 | |
| KR | 20170085681 A | | 7/2017 | |
| KR | 20180112617 A | | 10/2018 | |
| KR | 20190032843 A | | 3/2019 | |
| KR | 20200067100 A | | 6/2020 | |
| KR | 20200102194 A | | 8/2020 | |
| KR | 20200133289 A | * | 11/2020 | .......... H01M 50/249 |
| WO | WO-2012078727 A2 | * | 6/2012 | .......... H01M 50/289 |

* cited by examiner

BATTERY PACK AND VEHICLE COMPRISING THE SAME

CROSS-REFERENCE TO RELATED APPLICATIONS

The present application is a national phase entry under 35 U.S.C. § 371 of International Application No. PCT/KR2021/013727 filed Oct. 6, 2021, which claims the benefit of Korean Patent Application No. 10-2020-0134586 filed on Oct. 16, 2020, the disclosures of which are incorporated herein by reference in their entirety.

TECHNICAL FIELD

The present disclosure relates to a battery pack and a vehicle comprising the same, and more particularly, to a battery pack comprising battery modules mounted in multilayer and a vehicle comprising the same.

BACKGROUND ART

As opposed to disposable primary batteries, secondary batteries can be recharged and have a wide range of applications including not only mobile devices but also Electric Vehicles (EVs) and Hybrid Electric Vehicles (HEVs) that operate using an electrical power source. The types of secondary batteries being now used widely include lithium ion batteries, lithium polymer batteries, nickel cadmium batteries, nickel hydrogen batteries, nickel zinc batteries and the like. An operating voltage of a unit secondary battery cell, i.e., a unit battery cell is about 2.5V to 4.6V. Accordingly, when higher output voltages are required, a plurality of battery cells may be connected in series to construct a battery pack. Additionally, the battery pack may be constructed by connecting the plurality of battery cells in parallel depending on the charge/discharge capacity required for the battery pack. Accordingly, the number of battery cells included in the battery pack may be variously set depending on the required output voltage or charge/discharge capacity.

When the battery pack is constructed by connecting the plurality of battery cells in series/in parallel, a battery module including at least one battery cell, preferably, a plurality of battery cells is constructed, and then at least one battery module is used and other components are added to construct a battery pack. Here, the battery module refers to a component including the plurality of battery cells connected in series or in parallel, and the battery pack refers to a component including the plurality of battery modules connected in series or in parallel to increase the capacity and output.

In general, an automobile battery pack includes a plurality of battery modules or battery module assemblies arranged in the same plane to form a monolayer structure, in order to maintain the structural stability. The battery pack generates heat during charging/discharging, and when the temperature is too high, the efficiency reduces, so a cooling device is mounted below the battery module or the battery module assembly to reduce the heat. However, in case that the monolayer battery pack requires additional capacity when mounted in an electric vehicle requiring high capacity/high output, there are many structural limitations on the capacity increase. Additionally, when the capacity increases, it is difficult to structurally expand the cooling device.

Recently, Korean Patent Publication No. 10-2017-0085681 proposes a battery pack including battery modules mounted in multilayer. However, the battery pack includes a cooling water distribution system for cooling the multilayer battery module inside the battery pack. When the cooling water leaks due to a fault in the cooling water distribution system for cooling the multilayer battery module, the cooling water directly contacts electronic components and battery cells in the battery pack, causing dielectric breakdown and fires, and even explosions.

DISCLOSURE

Technical Problem

The present disclosure is designed to solve the above-described problem, and therefore the present disclosure is directed to providing a battery pack including battery modules mounted in multilayer to provide high capacity/high output and having an improved cooling structure to increase the stability.

The present disclosure is further directed to providing a vehicle comprising the battery pack.

These and other objects and advantages of the present disclosure may be understood by the following description and will be apparent from the embodiments of the present disclosure. In addition, it will be readily understood that the objects and advantages of the present disclosure may be realized by the means set forth in the appended claims and a combination thereof.

Technical Solution

To achieve the above-described object, a battery pack according to the present disclosure includes a first battery module; a first top cover provided on the first battery module; a second battery module mounted on top of the first battery module on the first top cover; a second top cover provided on the second battery module; an inter-top cover part as a cooling device interposed between the first top cover and the second top cover, and including a heatsink having a cooling water passage space inside, an inter-top cover part upper member in contact with an upper surface of the heatsink using thermal resin, and a heatsink port for entry/exit of cooling water to/from the cooling water passage space; a lower gasket provided at a contact area between the first top cover and the inter-top cover part; and an upper gasket provided at a contact area between the second top cover and the inter-top cover part.

The heatsink port may be exposed out of the first top cover.

The cooling water may flow in the cooling water passage space in parallel to the ground.

At least one first battery module forms a first battery module assembly, and the second battery module is mounted on top of the at least one first battery module of the first battery module assembly and thus is mounted in multilayer.

The second top cover includes an accommodating portion which covers the second battery module and a flange which is placed on the first top cover around the accommodating portion, and the inter-top cover part upper member includes an edge corresponding to the flange around the cooling water passage space.

The upper gasket may be formed along the edge on the edge.

The heatsink includes a heatsink lower member and a heatsink upper member joined by brazing to form the cooling water passage space, the heatsink lower member protrudes at a brazed area to the heatsink upper member along an area that forms the cooling water passage space, and the lower gasket is provided between the first top cover and a bottom of the edge including a bottom of the brazed area.

A fastening member for fastening the inter-top cover part protrudes at an outer periphery of the first top cover, and an edge of the inter-top cover part has a groove into which the fastening member is inserted.

Additionally, according to the present disclosure, there may be provided a vehicle comprising the above-described battery pack. The vehicle may include an electric vehicle (EV) or a hybrid electric vehicle (HEV).

Advantageous Effects

According to the present disclosure, it is possible to provide a battery pack of multilayer mount structure for mounting battery modules with space efficiency.

According to the present disclosure, the inter-top cover part for cooling the second battery module mounted on top is included in between the first pack cover and the second pack cover. Since it corresponds to an external cooling method in which the battery pack does not include a cooling device, when cooling water leaks from the inter-top cover part, the leaking cooling water does not directly affect the battery cell in the battery pack.

According to the present disclosure, before the inter-top cover part is damaged, since the heatsink upper member and the heatsink lower member are joined by brazing, the cooling water entering through the heatsink part port does not leak. Even if the inter-top cover part is damaged, the flow of the leaking cooling water from the inter-top cover part into the battery pack is prevented by the lower gasket and the upper gasket. Accordingly, it is possible to increase the stability by improving the cooling structure.

According to the present disclosure, since the cooling water flows in the cooling water passage space welded by the brazing process, the cooling efficiency is high. Accordingly, in case that the battery pack requires additional capacity when mounted in a device requiring high capacity/high output, it is possible to provide additional capacity by including the second battery module, and efficiently cool the second battery module to smoothly remove a large amount of heat generated during charging/discharging, thereby ensuring the safety of the battery pack during operation.

According to the present disclosure, in case that the inter-top cover part upper member is made of a material that is impossible to brazing, it is possible to maintain high cooling efficiency by heat exchange through the thermal resin.

DESCRIPTION OF DRAWINGS

The accompanying drawings illustrate a preferred embodiment of the present disclosure, and together with the following detailed description of the present disclosure, serve to provide a further understanding of the technical aspects of the present disclosure, and thus the present disclosure should not be construed as being limited to the drawings.

BEST MODE

Figure 1:
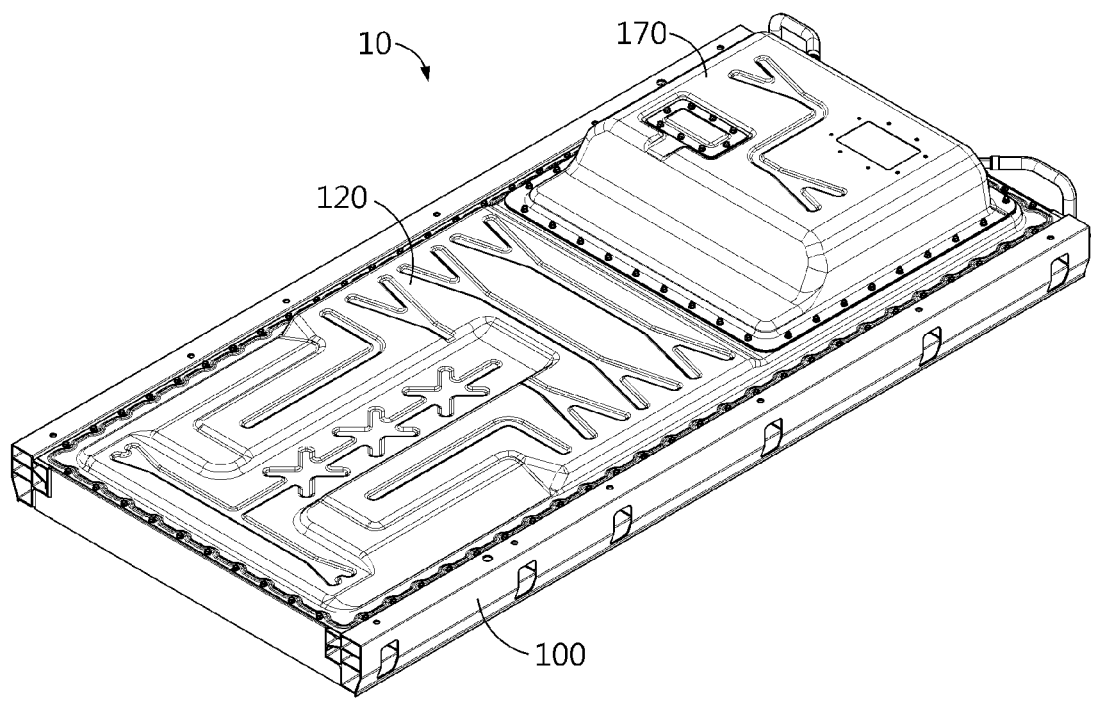
FIG. 1 is a perspective view of a battery pack according to an embodiment of the present disclosure.

The present disclosure will become apparent by describing the preferred embodiments of the present disclosure in detail with reference to the accompanying drawings. It should be understood that the embodiments described herein are provided for illustrative purposes to help an understanding of the present disclosure, and the present disclosure may be embodied in other different forms than the embodiments described herein. Additionally, to help an understanding of the present disclosure, the accompanying drawings are not illustrated in real scale, and the dimensions of some elements may be exaggerated.

That is, the embodiments described herein and the illustrations in the drawings are just a most preferred embodiment of the present disclosure and do not fully describe the technical features of the present disclosure, so it should be understood that a variety of other equivalents and variations could have been made thereto at the time of filing the patent application.

Figure 2:
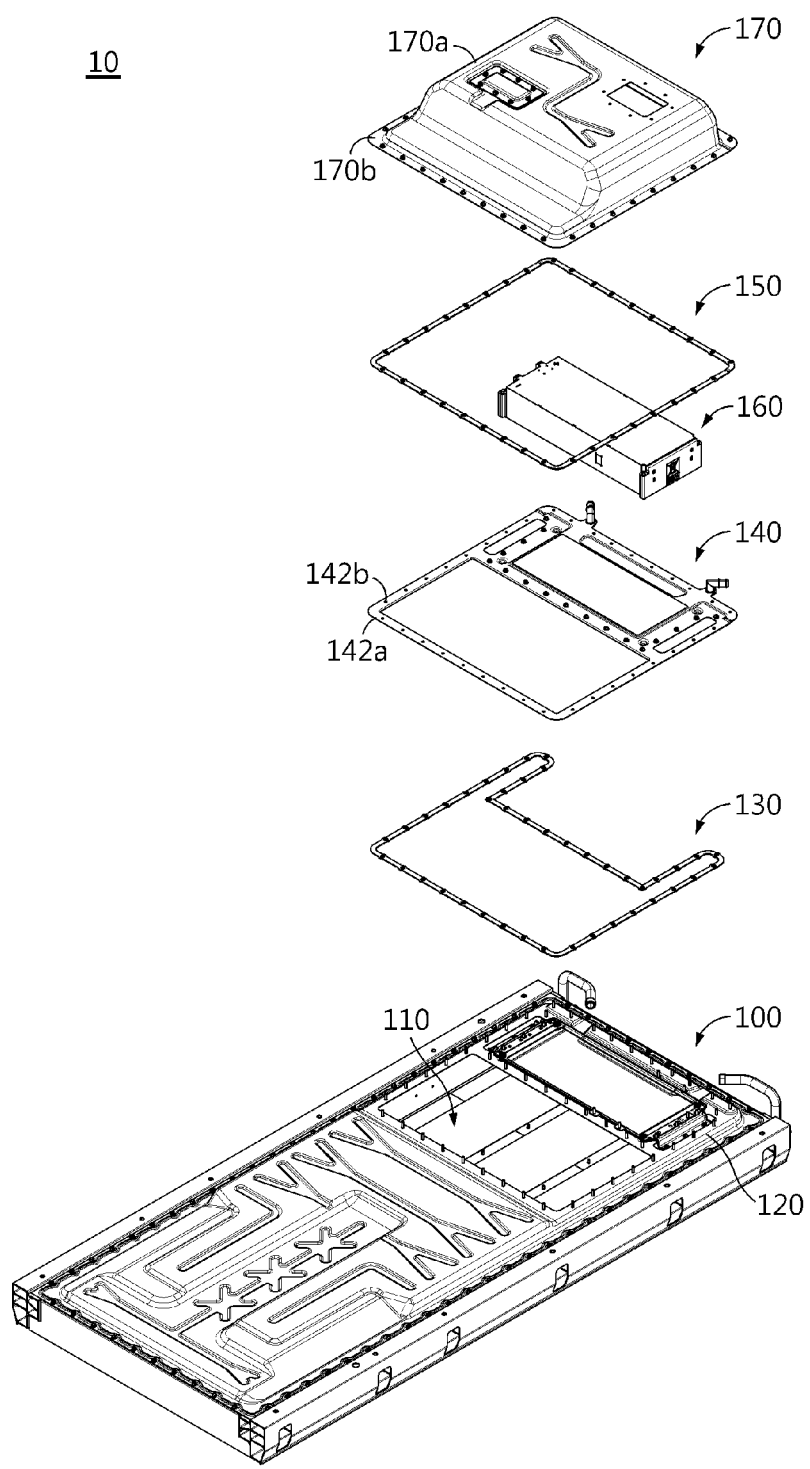
FIG. 2 is a partially exploded perspective view of the battery pack of FIG. 1.
Figure 3:
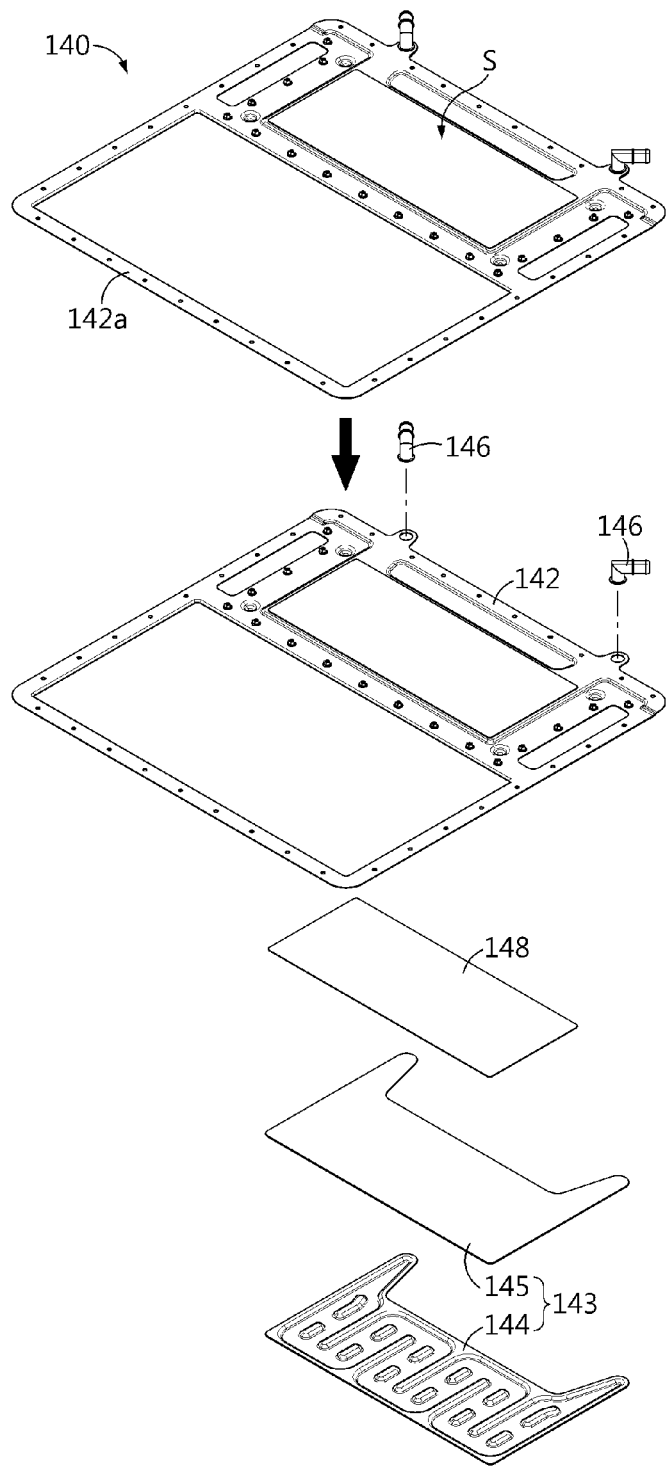
FIG. 3 is an assembled view and an exploded perspective view of an inter-top cover part included in the battery pack of FIG. 1.
Figure 4:
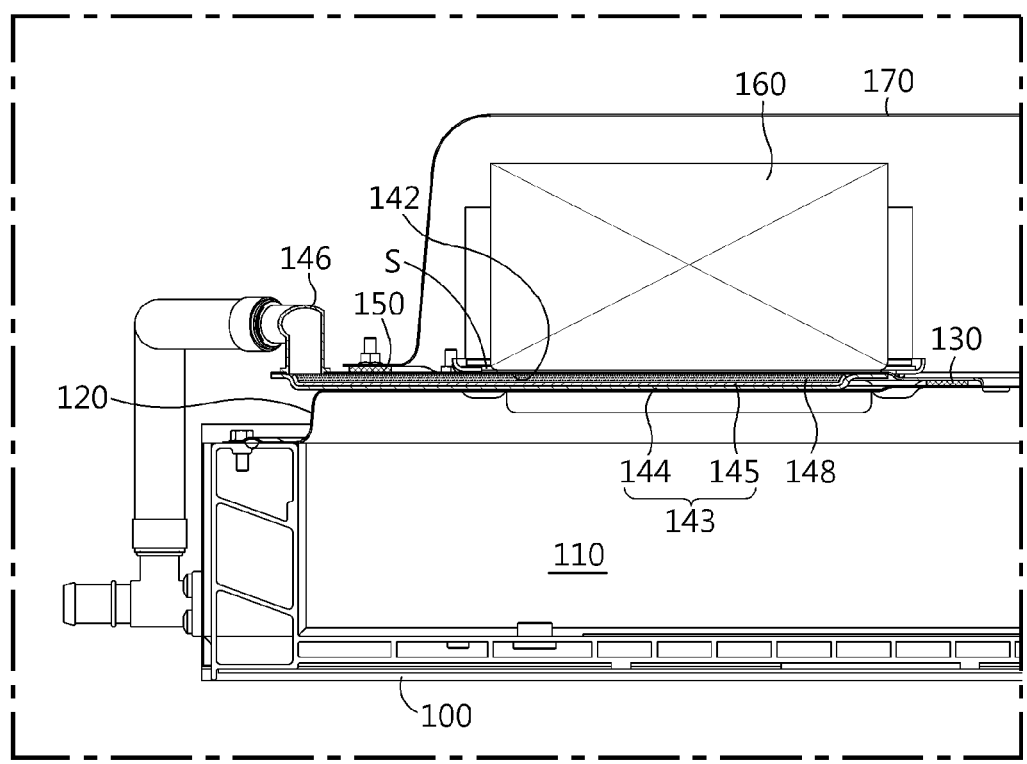
FIG. 4 is a schematic cross-sectional view of the battery pack of FIG. 1.

FIG. 1 is a perspective view of a battery pack according to an embodiment of the present disclosure. FIG. 2 is a partially exploded perspective view of the battery pack of FIG. 1. FIG. 3 is an assembled view and an exploded perspective view of an inter-top cover part included in the battery pack of FIG. 1. FIG. 4 is a schematic cross-sectional view of the battery pack of FIG. 1.

Referring to FIGS. 1 to 4, the battery pack 10 includes a tray 100, a first battery module 110, a first top cover 120, a lower gasket 130, an inter-top cover part 140, an upper gasket 150, a second battery module 160 and a second top cover 170.

The first battery module 110 is mounted on the tray 100. The tray 100 covers the bottom of the first battery module 110. The first battery module 110 may include a stack of at least one flat plate-type battery cell to form a cuboidal shape. A preferable flat plate-type battery cell is a pouch type battery cell. At least one first battery module 110 may form a first battery module assembly. For example, the first battery module 110 may be mounted in the tray 100 in three rows and three lines. A cooling device (not shown) for cooling the first battery module 110 may be further included on the bottom of the tray 100, or between the tray 100 and the first battery module 110. The cooling device may be a cooling plate including a conduit in which cooling water flows, and the cooling device may be mounted in thermal contact with the first battery module 110.

The first top cover 120 is provided on the first battery module 110 and covers the top of the first battery module 110 to protect the upper surface of the first battery module 110, and is coupled to the tray 100. The tray 100 and the first top cover 120 may comprise part of a plate shape having an approximately wide area over the area at which the first battery module 110 is mounted. The tray 100 and the first top cover 120 may be disposed on top and bottom of the first battery module 110 to cover the top and bottom of the first battery module 110, respectively. A fastening member for fastening the tray 100 may be inserted into the outer periphery of the first top cover 120. The fastening member may include, for example, a bolt or a rivet. The tray 100 and the first top cover 120 are coupled by the fastening member. Preferably, for example, welding, brazing or an adhesive may be used to join.

The second battery module 160 is mounted on top of the first battery module 110 on the first top cover 120. The second battery module 160 may include a stack of at least one flat plate-type battery cell to form a cuboidal shape. A preferable flat plate type battery cell is a pouch type battery cell. The second top cover 170 is provided on the second battery module 160 and positioned to cover the top of the second battery module 160. The second top cover 170 protects the second battery module 160 and is coupled to the first top cover 120. The battery pack 10 may further include a variety of devices (not shown) such as electrical components, for example, a Battery Management System (BMS), a current sensor and a fuse to control the charge/discharge of the first battery module 110 and the second battery module 160, and the first top cover 120 and the second top cover 170 protect them.

The second battery module 160 may be mounted on one first battery module 110, or at least two first battery modules 110. This embodiment shows one second battery module 160 mounted on three first battery modules 110. The second battery module 160 is mounted on top of the first battery module 110 spatially as described above to form a multilayer mount structure. Accordingly, the battery pack 10 of the present disclosure may include the first battery module 110 and the second battery module 160 mounted in multilayer to provide high capacity/high output.

The inter-top cover part 140 is a cooling device interposed between the first top cover 120 and the second top cover 170. The inter-top cover part 140 cools the second battery module 160 while in contact with the lower surface of the second battery module 160. The inter-top cover part 140 may be a cooling plate including a conduit in which cooling water flows, and the inter-top cover part 140 may be mounted in thermal contact with the second battery module 160.

The conventional battery pack includes a cooling water distribution system for cooling the multilayer battery module inside the battery pack. In contrast, in an embodiment of the present disclosure, the inter-top cover part 140 corresponding to a cooling device is interposed between the first top cover 120 and the second top cover 170 to separate the first battery module 110 from the second battery module 160 in the battery pack 10. Even if the cooling water leaks, the leaking cooling water does not directly contact the electrical components and the battery cells in the battery pack 10 protected by the first top cover 120 and the second top cover 170, thereby reducing the risks of dielectric breakdown, fires and explosions.

The inter-top cover part 140 includes an inter-top cover part upper member 142, a heatsink 143 and a heatsink port 146. The heatsink 143 may have a cooling water passage space S inside by joining a heatsink lower member 144 and a heatsink upper member 145 by brazing. The inter-top cover part upper member 142 is attached to the upper surface of the heatsink 143 through thermal resin 148. FIG. 3 shows the structure of the inter-top cover part 140 in detail.

The inter-top cover part upper member 142 may have almost a flat surface, and the heatsink 143 may have a flow channel to define the conduit in which the cooling water flows. For example, a plurality of beads or barriers may protrude from the upper surface of the heatsink lower member 144 to guide the cooling water entering from the heatsink port 146 to flow in the cooling water passage space S in the shape of 'S' or in a zigzag pattern until the cooling water exits the heatsink port 146. The heatsink upper member 145 is joined thereto by brazing to construct the heatsink 143. The heatsink lower member 144 protrudes at a brazed area to the heatsink upper member 145 along the area that forms the cooling water passage space S.

The heatsink lower member 144 and the heatsink upper member 145 are joined by brazing. Accordingly, the leakage risk of the cooling water entering from the heatsink port 146 is extremely low. Additionally, since the cooling water flows in the cooling water passage space S welded by the brazing process, the cooling efficiency is high.

Even in case that the inter-top cover part upper member 142 is made of a material that is impossible to brazing, for example, the inter-top cover part upper member 142 is made of polymer by pressing, as a result of attaching the heatsink 143 using the thermal resin 148, it is possible to maintain high cooling efficiency by heat exchange through the thermal resin 148.

The heatsink port 146 is exposed out of a first top cover 170. The cooling water enters and exits through the heatsink port 146 outside the first top cover 170. Even if leakage occurs in the heatsink port 146, there is no likelihood that the cooling water comes into direct contact with the first battery module 110 or the second battery module 160 in the battery pack 10. Additionally, the cooling water flows in the cooling water passage space S in parallel to the ground. It is possible to achieve efficient cooling over the wide surface of the second battery module 160. It is possible to control to prevent the temperature of the second battery module 160 from increasing above a preset temperature by the flow of the cooling water in the cooling water passage space S from the heatsink port 146.

The second top cover 170 includes an accommodating portion 170*a* which covers the second battery module 160 and a flange 170*b* which is placed on the first top cover 120 around the accommodating portion 170*a*. Additionally, the inter-top cover part upper member 142 includes an edge 142*a* corresponding to the flange 170*b* around the cooling water passage space S.

A fastening member for fastening the inter-top cover part 140 protrudes at the outer periphery of the first top cover 120, and the edge 142*a* of the inter-top cover part upper member 142 has a groove 142*b* into which the fastening member is inserted. The lower gasket 130 and the upper gasket 150 may have a groove into which the fastening member is inserted. The flange 170*b* of the second top cover 170 is coupled to the edge 142*a* of the inter-top cover part upper member 142 and thus may be coupled to the first top cover 120 coupled to the inter-top cover part upper member 142. Preferably, for example, welding, brazing or an adhesive may be used to join.

The lower gasket 130 is provided at the contact area between the first top cover 120 and the inter-top cover part 140 to seal up. The lower gasket 130 may be provided in between the first top cover 120 and the bottom of the edge 142*a* including the bottom of the brazed area.

The upper gasket 150 is provided at the contact area between the second top cover 170 and the inter-top cover part 140 to seal up. The upper gasket 150 may be formed along the edge 142*a* on the edge 142*a*.

The lower gasket 130 is disposed between the first top cover 120 and the inter-top cover part 140, and the upper gasket 150 is disposed between the inter-top cover part 140 and the second top cover 170. The inter-top cover part 140 and the inside of the battery pack 10 are separated through the lower gasket 130 and the upper gasket 150. Accordingly, even if the cooling water leaks from the inter-top cover part 140, it is possible to prevent the flow of the leaking cooling water into the battery pack 10, thereby preventing damage of the battery cell.

That is, according to the present disclosure, before the inter-top cover part 140 is damaged, since the heatsink lower member 144 and the heatsink upper member 145 are joined by brazing, the cooling water entering from the heatsink port 146 does not leak. Even if the inter-top cover part 140 is damaged, the flow of the leaking cooling water from the inter-top cover part 140 into the battery pack 10 is prevented by the lower gasket 130 and the upper gasket 150. Accordingly, it is possible to increase the stability by improving the cooling structure.

Figure 5:
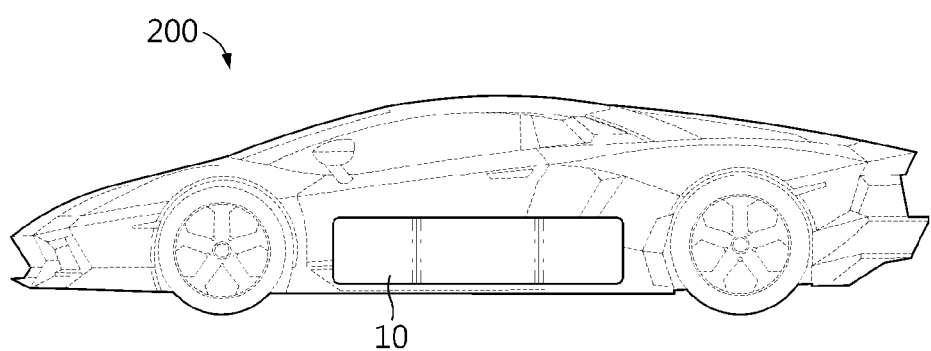
FIG. 5 is a diagram illustrating a vehicle according to another embodiment of the present disclosure.

FIG. 5 is a diagram illustrating a vehicle according to another embodiment of the present disclosure.

Referring to FIG. 5, the vehicle 200 may include the battery pack 10 of the previous embodiment. The vehicle 200 may include an electric vehicle, a hybrid electric vehicle or other vehicles using the battery pack 10 as a fuel source.

Since the vehicle 200 according to this embodiment includes the battery pack 10 of the previous embodiment, the vehicle 200 includes all the advantages of the battery pack 10 of the previous embodiment. The battery pack 10 may be provided in not only the vehicle 200 but also an energy storage system or other devices or apparatus using the battery pack 10 as an energy source.

Although the preferred embodiments of the present disclosure have been hereinabove illustrated and described, the present disclosure is not limited to the particular preferred embodiments described herein, and a variety of modification may be made thereto by those skilled in the art without departing from the claimed subject matter of the present disclosure, and such modifications fall in the scope of the claims.

What is claimed is:

1. A battery pack, comprising:
   a first battery module;
   a first top cover provided on the first battery module;
   a second battery module mounted on top of the first battery module on the first top cover;
   a second top cover provided on the second battery module;
   an inter-top cover part acting as a cooling device interposed between the first top cover and the second top cover, and including a heatsink having a cooling water passage space inside, the inter-top cover part including an inter-top cover part upper member in contact with an upper surface of the heatsink, and a heatsink port for entry/exit of cooling water to/from the cooling water passage space;
   a lower gasket provided at a contact area between the first top cover and the inter-top cover part; and
   an upper gasket provided at a contact area between the second top cover and the inter-top cover part.

2. The battery pack according to claim 1, wherein the heatsink port is exposed out of the first top cover.

3. The battery pack according to claim 1, wherein the cooling water flows in the cooling water passage space in a direction parallel to the ground.

4. The battery pack according to claim 1, wherein at least one first battery module forms a first battery module assembly, and the second battery module is mounted on top of the at least one first battery module of the first battery module assembly in a multilayer arrangement.

5. The battery pack according to claim 1, wherein the second top cover includes an accommodating portion which covers the second battery module and a flange which is placed on the first top cover around the accommodating portion, and the inter-top cover part upper member includes an edge corresponding to the flange around the cooling water passage space.

6. The battery pack according to claim 5, wherein the upper gasket is formed along the edge on the edge.

7. The battery pack according to claim 5, wherein the heatsink includes a heatsink lower member and a heatsink upper member joined by brazing to form the cooling water passage space, the heatsink lower member protrudes at a brazed area to the heatsink upper member along an area that forms the cooling water passage space, and the lower gasket is provided between the first top cover and a bottom of the edge including a bottom of the brazed area.

8. The battery pack according to claim 1, wherein a fastening member for fastening the inter-top cover part protrudes at an outer periphery of the first top cover, and an edge of the inter-top cover part has a groove into which the fastening member is inserted.

9. A vehicle comprising the battery pack according to claim 1.

* * * * *